United States Patent [19]

Nidbella

[11] 4,257,297
[45] Mar. 24, 1981

[54] CIRCULAR SAW WITH VISUAL CUT LINE INDICATOR

[76] Inventor: Peter Nidbella, 436 Morrow Ave., Carnegie, Pa.

[21] Appl. No.: 8,031

[22] Filed: Jan. 31, 1979

[51] Int. Cl.³ .......................... B27B 5/20; B27B 5/29
[52] U.S. Cl. .................................. 83/471.3; 83/478; 83/520; 83/522
[58] Field of Search ................. 83/520, 521, 522; 30/123, 388, 389, 390, 391, 471.3, 486.1, 478

[56] References Cited

U.S. PATENT DOCUMENTS

| | | | |
|---|---|---|---|
| 1,841,867 | 1/1932 | Wiegelmann | 83/522 X |
| 2,806,492 | 9/1957 | Becker | 83/520 |
| 3,007,499 | 11/1961 | Dobslaw | 83/486.1 X |
| 3,097,430 | 7/1963 | Lewinski et al. | 30/123 R |
| 3,504,716 | 4/1970 | Bush et al. | 30/123 |

*Primary Examiner*—J. M. Meister
*Attorney, Agent, or Firm*—George C. Atwell

[57] ABSTRACT

On a power saw of the type having a circular saw blade which is operatively moved against a stationary workpiece to perform a cross cutting action thereon, a lighting device is provided on the saw to cast the shadow of the blade edge on the workpiece ahead of the saw whereby the operator can manipulate the workpiece so that a mark or point thereon comes into aligned registration with an edge of the shadow.

14 Claims, 6 Drawing Figures

CIRCULAR SAW WITH VISUAL CUT LINE INDICATOR

In the use of power saws of the "cut-off" type which use a rotating circular blade for movement against a stationary workpiece, such as a pipe, board, or other piece to be severed, there is a recurring problem in the use of such saws in quickly, accurately determining exactly where the cut kerf will occur on the workpiece. This problem is a particular annoyance where the job being performed involves a series of successive cut-off operations on a long workpiece or on a plurality of successive workpieces to be similarly cut. This alignment problem is common in the use of a certain category of power saws wherein the object or workpiece to be cut is held stationary while the circular blade is caused to move thereacross. Power saws of the aforementioned type include at least (1) the radial arm saw where a horizontal arm is extended in a spaced-above parallel relation to a work surface and a sliding carriage on the arm suspends a motor and an associated cutting blade to be drawn across and over a board to be cross-cut on the work surface; (2) a "chopsaw" which may be used for cutting lengths of pipe, steel, various masonry objects, etc., and has its motor and blade pivotally supported for manual arcuate movement relative to a work supporting surface, and wherein the blade may be of bonded granular composition for cutting a kerf through the workpiece by an abrading action; (3) a powered circular mitering saw, which has the same pivotal action as the afore-mentioned "chopsaw"; and (4) a portable hand-held circular power saw which has a downwardly facing flat guiding surface below which the blade edge protrudes, this sometimes being referred to as a builder's saw.

The different saws heretofore described share the characteristic that the blade is caused to move into the workpiece, and the operator, in using the saw, is looking downwardly at the top surface of the workpiece while the cutting action is performed thereon and is usually attempting to achieve a cutting action in accordance with a mark or line previously thereon inscribed.

The aforementioned problem is encountered, for example, when a home builder is attempting to make successive cross cuts on framing stock for "roughing in" a window opening. The saw can be preset to achieve a square cut across a board positioned on its work surface and against its back fence whereby the cut end of the board will be 90° to both the back fence and the work surface at the completion of the cutting action. The builder's normal procedure may be to use a carpenter's tri-square to pencil a straight line across the board to mark its desired length and then place the board on the saw's work surface with the penciled line in registered alignment generally with the blade slot in the saw's back fence. To be certain that the saw's blade will cut through the board exactly along the penciled line, the builder may before actuating the saw's motor manually move the carriage to cause the blade to move forwardly through the back fence slot and against the board.

The aforedescribed cut-line alignment procedure is a time-consuming task which occurs similarly in the use of the other types of power saws described above.

This invention enables a comparatively rapid procedure in the use of such power saws by the provision thereon of a light means which casts a shadow line of the blade's cutting edge on the workpiece which is, in effect, a visible path of the anticipated blade cut or kerf, and which can be visually aligned with a small mark placed on the workpiece at the desired cut location.

In its presently preferred embodiment, the invention includes the provision of a light means, preferably an incandescent light bulb of relatively high intensity output, mounted outwardly adjacent an opening in the upper blade shroud or guard, at a point toward the rear of the guard, whereby light will be cast through the guard and across the blade to cast a shadow of the cutting edge forwardly onto the workpiece. Experimentation with such an arrangement has shown that sharpness, intensity, and shadow edge definition can be influenced and controlled by having the light source adjustably mounted to enable its selective repositioning within limits to and away from the upper blade edge and laterally relative to the plane of the blade.

The general concept of casting a shadow of a member other than a saw blade onto a workpiece, but in the plane of the saw blade, is known in the prior art as exemplified by U.S. Pat. Nos. 1,476,238, 1,786,925, 2,307,820 and 2,510,471. The provision on a machine of a means for casting a shadow for the purpose of machine registration wherein the shadow is of a normally existent machine part instead of a part provided specifically to cast the shadow is found in U.S. Pat. No. 2,730,173. There are also various types of machine tools in the prior art equipped to cast a beam of light, as opposed to a shadow directly onto a workpiece for registering the location of work to be formed thereon, as found in U.S. Pat. Nos. 1,388,110; 1,601,354; 1,804,764; and 2,806,492. British Patent 711,331 teaches the concept of casting a light beam directly on a workpiece for the purpose of work location registration and also teaches the concept of providing a wire between a light source and the workpiece to cast a shadow of the wire on the workpiece.

The preferred embodiment of the present invention also includes the providing of a transparent window in the blade guard shroud and mounting the light source outside such window. This provision preserves a secondary purpose of the guard, which is to act as an arcuate tunnel through which saw dust or abrasion chips are directed by the air flow created by the rotating of the blade. In the present invention, the transparent window prevents exiting of the particles at the opening and resultant impingement and/or build up against the light source, and the moving current caused by the rotating blade tends to maintain the window clear whereby there is no interference with shadow production.

The provision of window means on a blade guard in the prior art is found in U.S. Pat. Nos. 2,795,248 and 1,830,579, but the window is in a different location for a different purpose as compared to the teaching of the present invention. The provision, on a saw having an upper guard shrouding part of a circular blade, of a light source in combination therewith is found in U.S. Pat. No. 2,488,947, but is for the purpose of full forward illumination of the workpiece rather than the production of a shadow line indicator as comprehended by the invention detailed herein.

None of the prior art references cited above deal with the primary objective of this invention, which is the provision, on a "cut-off" saw of the type having a rotating circular blade which is caused to move against a stationary workpiece to achieve a cutting action thereon, of a light means adapted to cast the shadow of a part of the tool on the workpiece so that a discernible straight line is obtained to indicate the anticipated cutting path of the tool, either prior to or during operation of the tool. Manual alignment between the tool and the workpiece can then be appropriately established to have the shadow line edge register with a mark on the workpiece at a desired location for the cut.

Other features and objectives of the present invention will become apparent from the following detailed description wherein.

Figure 1:
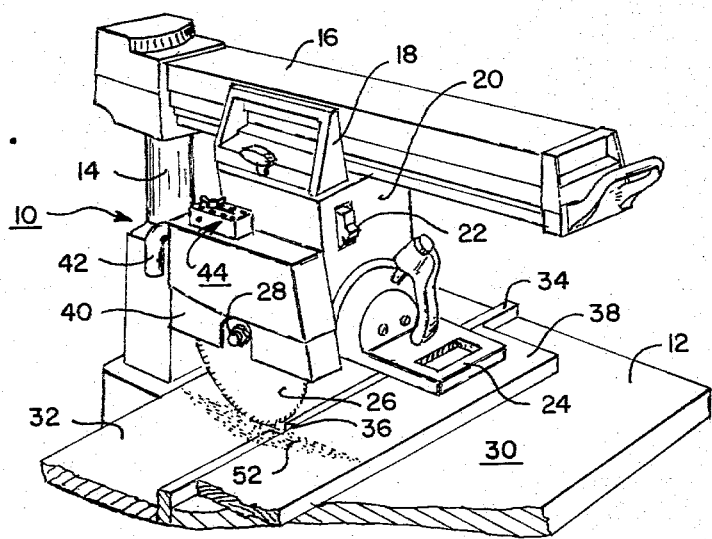
FIG. 1 is a perspective view of a radial saw assembly showing portions thereof cut away, and illustrating one form of the structure of the present invention.

In FIG. 1 there is shown a radial arm saw 10 comprising a stationary table or support surface 12 behind which is an upwardly projecting vertical support post 14. From the support post 14 an elongated arm 16 projects forwardly over the table 12 and has suspended therefrom a carriage 18 which is slidably arranged to be selectively moved along the arm 16. Suspended by the carriage 18 is an electric motor within a housing 20 which is actuated by a control button 22. Forward of the motor housing 20 is a handle means 24 for manually causing the entire carriage 18 and motor housing 20 to move as a unified structure, along the arm 16 and over the work surface 12 to perform a cutting action in which the rotating blade 26, carried on the motor's rotating arbor 28, will perform a straight line cutting action as hereafter described.

The work surface 12 comprises a front section 30 and a back section 32 separated by a straight upwardly projecting back fence 34. The back fence 34 has a slot 36 through which the blade 26 forwardly moves to perform its cutting action on a guard or workpiece 38. FIG. 1 also shows a rigid shroud 40 serving as an upper blade guard means. The shroud 40 is attached by known means to the housing 20 on its rear side to enable its temporary removal when it is desired to change the blade on the arbor 28. Rotation of the blade 26 creates an air stream in an arcuate pathway on the periphery of the upper blade edge beneath the shroud which carries saw dust upwardly and rearwardly through the shroud 40 and out through a conduit 42 whereby the saw dust does not collect in the area of the cutting operation performed on the workpiece 38.

Figure 2:
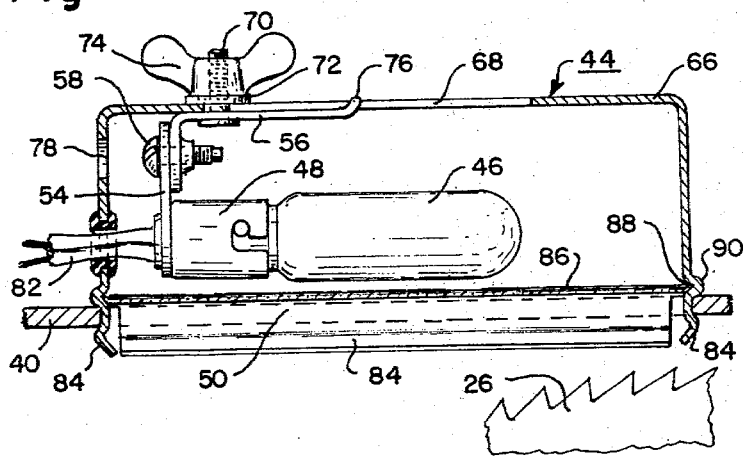
FIG. 2 is a view in enlarged vertical section of a part of the assembly first shown in FIG. 1.
Figure 3:
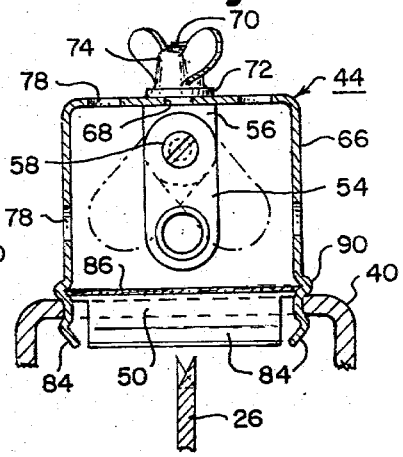
FIG. 3 is a view in enlarged vertical section of the same assembly in FIG. 2 but taken in a plane transverse to the illustration in FIG. 2.
Figure 4:
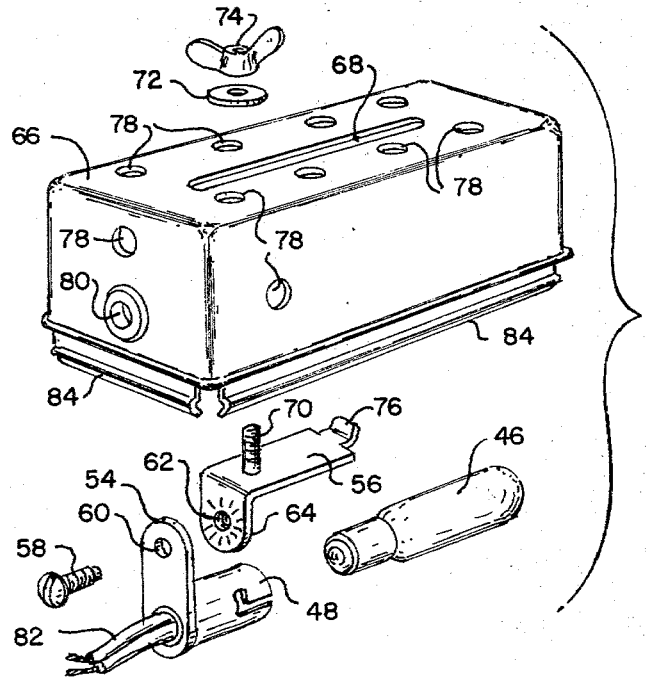
FIG. 4 is a perspective "exploded" view of the components in the assembly shown in FIGS. 2 and 3, to illustrate such components in greater detail.

On the upper surface of the shroud 40 is an assembly 44, shown in detail in FIGS. 2, 3 and 4. The assembly 44 serves as a light means including a light source in the form of an incandescent bulb 46 mounted in a socket 48. The light source 46 is positioned upwardly adjacent a bottom opening 50 in the shroud 40 whereby the blade 26 is interposed generally between the light source 46 and the front section 30 of the work table 12 and light emitted from the bulb 46 will be cast downwardly over the blade 26. The blade 26 interrupts the cast light pattern whereby a shadow 52 is visible on the table surface 12 or on a board 38 placed on the table 12 and against the fence 34, as shown in FIG. 1.

With further reference to FIGS. 2, 3 and 4, it will be seen that the light means 44 includes therewith a provision to enable the selective readjustment of the position, within limitations, of the light source 46 so that the intensity, sharpness, position and edge definition of the shadow 52 (FIG. 1) can be modified. Such adjustment is required to obtain a discernible straight line on one side or the other of the shadow image on the workpiece, particularly when the type or size of blade used in the saw is changed.

In the embodiment as shown in FIG. 2, adjustment of the light source is made possible by having the socket 48 firmly mounted to a plate 54 which is pivotally attached to a bracket 56 by means of an adjustable screw 58. The screw 58 extends through an opening 60 in plate 54 and threadably connects to a threaded opening 62 in a downwardly extending tongue 64 of bracket 56. The rearward face of tongue 64 is provided with circumferentially spaced indentations for engaging similar indentations (not shown) about opening 60 on the plate 54 and thereby causing a locking action between the plate 54 and the tongue 64 when the plate 54 is selectively pivoted to either side, as shown in FIG. 3, and the screw 58 is tightened to force the surfaces of the plate 54 and the tongue 64 in tight fitting coacting relationship.

The light source 46 is contained within a rectangular hood 66. The bracket 56 supporting the light source 46 attaches in a longitudinal slot 68 provided in the upper wall of the hood 66. An integral upwardly projecting threaded post 70 on the bracket 56 extends through the slot 68, and a washer 72 and butterfly nut 74 are employed on the post 70 to complete the connection of the bracket 56 to the hood 66. The bracket 56 has an upwardly projecting forward tongue portion 76 which engages in the slot 68 and maintains the bracket in aligned position with the slot while permitting its forward-rearward sliding adjustment relative to the slot to thereby move the light source longitudinally within the hood 66.

As shown most clearly in FIG. 4, the hood 66 is also provided with a plurality of spaced-apart upper wall and side wall openings 78 to enable a convection current flow through the hood 66 to dissipate the heat energy emitted from the light source 46. A rear side wall grommeted hole 80 enables the extension therethrough of insulated wires 82 (FIG. 2) for conducting electrical current to the light source 46. The bottom peripheral edge of the hood 66 is formed to have downwardly depending outwardly ridged peripheral skirt portions 84 enabling a snap-in removable installation of the hood 66 into the shroud bottom opening 50.

Installed across the bottom of the open side of the hood 66, as shown in FIGS. 2 and 3, is a rectangular transparent window 86. It will be noted, in reference to FIG. 2, that around the inside walls of the hood 66, just above the downwardly depending peripheral skirt portions 84, an inside groove 88 has been provided by outwardly deforming the hood side walls. The inside groove 88 serves to receive the edges of the transparent window 86 therein and thereby retain the window 86 in its mounted position. The corresponding outside surface of the groove 88 is a ridge 90 serving, in combination with the lower end of the peripheral skirt portion 84, to lock against the edge of the shroud 40 defining the opening 50 and hold the hood 66 in its removable installed position on the shroud 40.

Figure 5:
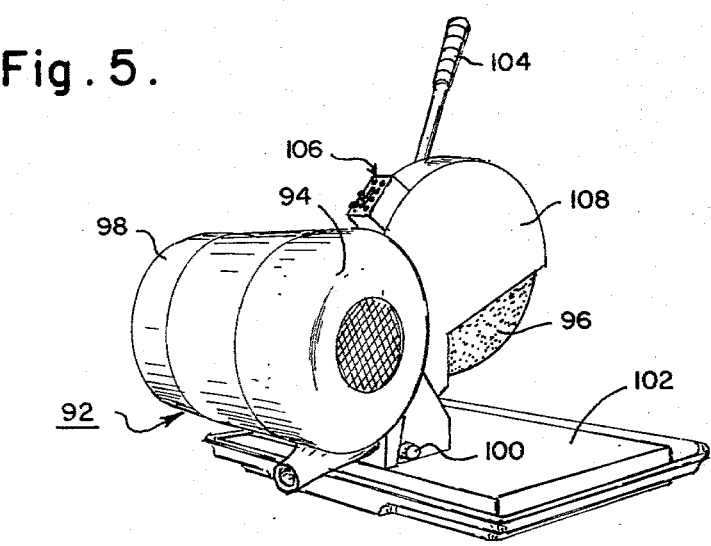
FIG. 5 is a perspective view of a cut-off saw or "chopsaw" incorporating the structure of the present invention.
Figure 6:
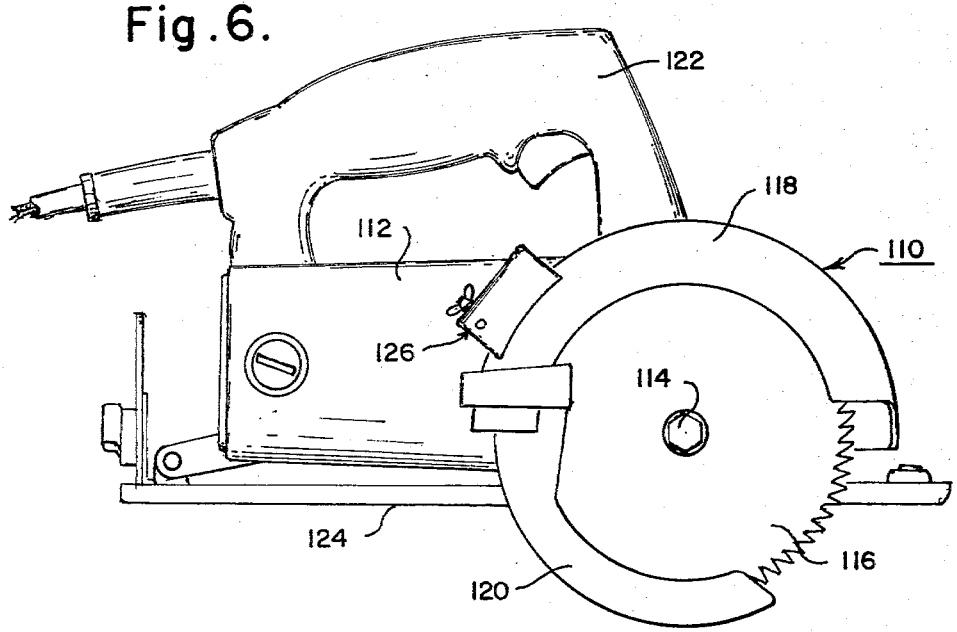
FIG. 6 is a perspective view of a portable hand-held circular saw illustrating still another form of the present invention.

Having heretofore described the radial saw shown in FIGS. 1-4 it should now be evident to anyone skilled in the art that the described light source arrangement or assembly may be equally beneficially employed in the type of cut-off saw structures shown in FIGS. 5 and 6. FIG. 5 illustrates a stationary "cut-off" power saw 92 having an electric drive motor within a housing 94 connected in a power-transmitting drive arrangement to an abrasive type blade 96. The drive arrangement for the blade 96 (not shown) is contained within a shrouding portion 98. All of the constituent parts of the saw 92 heretofore mentioned are mounted to rock or pivot about a pivot point 100 toward and away from a stationary work surface 102 by manipulation of a lever 104. A light means 106, which may be constructed and mounted generally in accordance with the arrangement illustrated in FIGS. 2, 3 and 4, is mounted on a blade guard 108 to cast light through the guard 108 and across the blade 96 to register the blade's shadow on the work surface 102.

In FIG. 6 there is illustrated a portable hand-held circular saw or builder's saw 110 comprising a motor 112 geared to drive an arbor 114 on which is mounted a circular saw blade 116. The upper portion the blade 116 is partially enclosed by a guard 118, and the lower edge of the blade is partially enclosed by a guard 120 which is adapted to operatively swing backwardly into guard 118 in a telescoping action. Above the motor 112 is a handle 122 for manipulating the saw 110, and the entire saw structure as heretofore described is pivotally connected to a downwardly facing flat guide surface 124. Operation of the general type of tool illustrated in FIG. 6 is well known, the tool being manipulated whereby the downwardly facing guide surface 124 slides over the upper surface of the workpiece to be cut by the blade 116. Mounted on the guard 118, in a position rearward relative to the arbor 114, is a light means 126. The light means 126 when assembled generally in accordance with the arrangement described in FIGS. 2, 3 and 4 will project light downwardly across the blade 116 to cause the shadow of the blade to be discernible on the workpiece to be cut. In this tool, because the lower guard 120 is arranged to telescope rearwardly-upwardly within the upper guard 118 as the tool is moved to cut the workpiece, guard 120 is preferably formed from a transparent rigid plastic shatter-resistant material whereby its movement across the path of the light emitted by the light means 26 will not prevent formation of the shadow of the blade on the workpiece to be cut. Alternatively, the guard 120 may be formed of metal and have an elongated slit (not shown) therethrough which extends in the guard 120 parallel to the blade edge and permits light to be cast through the moving guard and toward the workpiece during use of the saw 110. In this arrangement, the opening or window in the stationary guard 118 would be in alignment with the elongated slit in the guard 120.

Having heretofore described certain preferred forms of the invention, it should be pointed out that in each form the desired result of projecting a shadow to indicate the blade path preferably involves having a light source disposed in a position relative to the workpiece or work surface such that the light source intersects or is disposed across an imaginary straight line extended from the general area on the work surface where the cut is to be made and through the plane of the cutting blade whereby the narrow dimension of the blade forms the desired shadow. It has been determined that even a relatively large light mounted upwardly and rearwardly over the blade and oriented to generally illuminate the entire area can also be utilized to project a discernible and usable shadow on the work surface. It is preferred, however, that a relatively small but intense light source be used for the specific purpose of casting the blade shadow, particularly because the desired effect can be obtained in ambient day light or a normally well-lighted workshop.

It is contemplated that the light means of the present invention could be a stationary light source having a light transfer means such as fiber optics or any known means of specifically directing light rays to transfer the required light to the upper blade vicinity and obtain the effect taught herein. Moreover, in any arrangement consistent with the teachings of this invention, the electrical wiring to the light source can be by separate incoming insulated conductors or the current to the light can be wired from the incoming electrical conductors to the motor so long as such connection bypasses the control switch actuating the motor. It is contemplated that a separate on-off switch can also be provided for the aforedescribed light source, if desired.

While certain presently preferred forms of the invention have been heretofore described and shown, other equivalent variations may occur to those skilled in the art in light of the above teachings. It should be understood that the appended claims are intended to cover, within their spirit and scope, all such variations.

I claim:

1. A power saw of the type having a circular saw blade rotatable about an axis perpendicular to the plane of the blade's surface and movable relative to a stationary workpiece to achieve a cutting action on the workpiece, light means mounted on the machine adjacent to the blade and in a location generally away from the workpiece whereby the blade is interposed generally between the light means and the workpiece, and the light means being oriented to cast light rays toward the workpiece such that a shadow of the blade will be discernible on the workpiece to indicate to the saw's operator the intended line of cut of the saw blade when the blade is advanced to perform its cutting action on the workpiece.

2. The invention of claim 1 wherein the blade is partially enclosed by a hood-like guard means disposed generally above the blade's axis and the light means is disposed to cast its rays inwardly through the guard means and thence to the workpiece.

3. The invention of claim 1 further including adjustable mounting means for the light means permitting an operator to selectively alter the orientation of the light means relative to the blade and thereby change visible characteristics of the shadow.

4. The invention of claim 1 wherein the saw is a stationary radial saw having a substantially horizontal work surface for supporting the workpiece, an elongated arm extends over the work surface and generally parallel thereto, carriage means is slidably secured on the arm and suspends a motor therebeneath which is adapted to drive the circular saw blade to perform its cutting action, and the light means is movable with the carriage means.

5. The invention of claim 1 wherein the saw is a stationary tool having a substantially horizontal work surface for supporting the workpiece, and further comprises a motor for driving the rotatable shaft, the shaft axis being generally parallel to the work surface, and the motor having a support frame which is pivotally mounted to permit manual movement of the motor in an arcuate pathway through a vertical plane to obtain the cutting action on the workpiece.

6. The invention of claim 1 wherein the saw is portable, has at least one gripping handle for the hand of an operator, a flat guiding surface for movement against the surface of a workpiece to be cut, and rigid blade-guard means enclosing at least part of the cutting blade.

7. The invention of claim 6 wherein the light means includes a light source disposed to project light from adjacent the blade-guard means and across the cutting blade.

8. A radial saw including a stationary horizontal work surface, an arm extending over and generally parallel to the work surface, carriage means supporting a rotary-shaft type motor for selective sliding movement along the arm, a circular cutting blade mounted on the motor shaft for cutting a workpiece supported on the work surface by the sliding movement of the motor along the arm and over the work surface, and light means movable in unison with the motor and adapted to visually cast on the work surface and on the edge of the workpiece disposed thereon at the point where the cut will commence, a temporary straight guide line image which will be traversed by the blade when the motor is slideably moved over the work surface to perform its cutting action.

9. The radial saw of claim 8 wherein the light means comprises a light source on the carriage means and movable with the motor, the light source being disposed upwardly from the motor shaft and across an imaginary straight line extended from the work surface and through the plane of the cutting blade.

10. The radial saw of claim 8 wherein the path is a shadow of the cutting blade.

11. The radial saw of claim 8 wherein the light means includes a light source, and further comprising mounting means securing the light source on the carriage means, and the mounting means being adjustable to permit selective positioning of the light source relative to the cutting blade.

12. The radial saw as in either claim 8 or 11 further comprising a blade-guarding shroud supported on the carriage means and over part of the blade and serving as part of the mounting means for the light source.

13. The radial saw of claim 12 wherein the shroud has an opening to permit light to pass therethrough and the light source is mounted relative to the opening to cast light rays therethrough and toward the work surface.

14. The radial saw of claim 13 wherein the opening has a transparent window thereacross.

* * * * *